United States Patent
Fortney

(10) Patent No.: US 8,931,835 B1
(45) Date of Patent: Jan. 13, 2015

(54) APPARATUS FOR PROTECTING AN INTERNAL STRUCTURE OF A VEHICLE FROM HEAT AND/OR SUNLIGHT, AND METHODS OF MAKING AND USING THE SAME

(76) Inventor: Jeanette Fortney, Fresno, CA (US)

( * ) Notice: Subject to any disclaimer, the term of this patent is extended or adjusted under 35 U.S.C. 154(b) by 343 days.

(21) Appl. No.: 13/231,478

(22) Filed: Sep. 13, 2011

Related U.S. Application Data

(60) Provisional application No. 61/384,844, filed on Sep. 21, 2010.

(51) Int. Cl.
*A47C 7/62* (2006.01)
(52) U.S. Cl.
USPC .................................. 297/184.1; 297/184.11
(58) Field of Classification Search
USPC .......... 297/227–229, 184.1, 184.11; 296/1.07
See application file for complete search history.

(56) References Cited

U.S. PATENT DOCUMENTS

| | | | | |
|---|---|---|---|---|
| 4,118,066 A | | 10/1978 | Ricke | |
| 4,396,227 A | * | 8/1983 | Neilson | 297/228.11 |
| 4,458,738 A | * | 7/1984 | Wilson | 150/154 |
| 4,676,549 A | * | 6/1987 | English | 297/224 |
| 4,693,511 A | * | 9/1987 | Seltzer et al. | 297/228.1 |
| 4,790,592 A | | 12/1988 | Busso et al. | |
| 4,877,074 A | * | 10/1989 | Castellano | 160/84.04 |
| 4,986,343 A | | 1/1991 | Sing | |
| 5,005,901 A | * | 4/1991 | Hinde | 297/229 |
| 5,024,262 A | * | 6/1991 | Huang | 160/370.21 |
| 5,114,204 A | | 5/1992 | Bernardo | |
| 5,234,252 A | * | 8/1993 | Wallach | 297/229 |
| 5,378,518 A | | 1/1995 | Wang | |
| 5,474,329 A | * | 12/1995 | Wade et al. | 280/749 |
| 6,764,134 B1 | * | 7/2004 | Crescenzi et al. | 297/219.12 |
| 7,287,813 B2 | * | 10/2007 | Aliev | 297/219.1 |
| 2003/0218367 A1 | * | 11/2003 | Parker et al. | 297/229 |
| 2004/0075309 A1 | * | 4/2004 | Samaha | 297/184.11 |

(Continued)

FOREIGN PATENT DOCUMENTS

JP 63-82817 A 4/1988
JP 2001-246942 A 9/2001

OTHER PUBLICATIONS

Taisuke Inoue; "Manual Automobile Sun Shade to Magnetically Fix Opening/Closing Portion"; espacenet—Bibliographic data; Japanese Publication Number: JP2001246942 (A); Publication Date: Sep. 11, 2011; Worldwide Database, http://worldwide.espacenet.com/.

(Continued)

*Primary Examiner* — David R Dunn
*Assistant Examiner* — Alexander Harrison
(74) *Attorney, Agent, or Firm* — Andrew D. Fortney; Central California IP Group, P.C.

(57) ABSTRACT

Apparatuses for protecting internal structures of a vehicle from environmental factors, such as light and/or heat, and methods of making and using such apparatuses are described. The apparatus reflects sunlight, ultra-violet rays, and/or heat away from the internal structure(s) of a vehicle, such as the seats, the steering wheel, and/or the gear shift. Therefore, absorption of heat and sunlight is minimized or prevented while the vehicle is parked in the sun. The apparatuses cover the entire major surface(s) of the internal structure(s), and thus enable an individual to immediately sit on or contact the interior structures of the vehicle without experiencing pain or discomfort when entering the vehicle.

19 Claims, 5 Drawing Sheets

(56) References Cited

U.S. PATENT DOCUMENTS

| | | | |
|---|---|---|---|
| 2004/0075310 A1* | 4/2004 | Wang | 297/184.11 |
| 2006/0138820 A1* | 6/2006 | Riley | 297/228.1 |
| 2009/0091165 A1* | 4/2009 | Thompson | 297/228.12 |
| 2009/0189427 A1* | 7/2009 | Lalji | 297/229 |
| 2010/0140994 A1* | 6/2010 | Moore | 297/227 |

OTHER PUBLICATIONS

Norio Kazama; "Rear Sun Shade for Vehicle"; espacenet—Bibliographic data; Japanese Publication No. JP63082817 (A); Publication Date: Apr. 13, 1988; Worldwide Database, http://worldwide.espacenet.com/.

* cited by examiner

APPARATUS FOR PROTECTING AN INTERNAL STRUCTURE OF A VEHICLE FROM HEAT AND/OR SUNLIGHT, AND METHODS OF MAKING AND USING THE SAME

RELATED APPLICATIONS

This application claims the benefit of U.S. Provisional Patent Application No. 61/384,844, filed Sep. 21, 2010, incorporated by reference herein in its entirety.

FIELD OF THE INVENTION

The present invention generally relates to the field of vehicles and protection of internal structures of vehicles. More specifically, embodiments of the present invention pertain to apparatuses for protecting internal structures of a vehicle and methods for making and using such apparatuses.

DISCUSSION OF THE BACKGROUND

Various types of automobile shades are available in the art. For example, conventional automobile shades may include manual car sun shades that cover a front windshield or a rear window of an automobile. Such conventional automobile shades may include a reflective material.

For example, one conventional shade disclosed in U.S. Pat. No. 4,118,066 includes a spring-wound retractable roller shade that is permanently attached to a portion of a seat in the automobile. The roller shade disclosed in U.S. Pat. No. 4,118,066 appears to require hardware, such as a spring-wound roller, mounting brackets, and a longitudinal axial shaft.

Also, U.S. Pat. No. 4,790,592 discloses an extendable-retractable rolled covering that is mounted onto the seat with a permanently attached trim piece, having a J-shaped plastic retention member. The covering is made of a material that is highly stain and soil resistant. However, this covering may not completely cover all areas of the seat (e.g., it may cover just the seat bottom cushion or the bottom and back part of the seat).

Another type of automobile shade includes a thermal insulating shade (see U.S. Pat. No. 4,986,343). This thermal insulating shade can reflect heat in hot weather and can be reversed to retain heat in cold weather. This thermal shade has at least one envelope with substantially parallel side panels that hold insulating air between them. The insulating shade has two envelopes where air can be pumped into and out of each envelope. The air can be supplied by the car or another source like a motor run by a car battery, (alkaline) battery, and/or solar cell battery. The shade of the '343 patent extends from the front shelf of the car (like the dash) to the rear shelf of the car and is held in place by a tubular cross support under the rear bend of the unit. Suction cups, releasable adhesive spacers or conventional hangers are used to attach the shade to a window, door or roof. The shade can be used in a car or in a house used to shade/cover a window.

U.S. Pat. No. 5,114,204 discloses a flexible cover that uses a support frame to cover an entire interior portion of the automobile, in which the cover is positioned below the lower edge of windshield, side windows and rear window. The flexible cover of the '204 patent uses a support frame to keep the cover snug and taught in place. It has a steering wheel hood, a seat headrest hood and a belt. The material can be canvas, nylon, rayon or other ultraviolet (UV) protecting material. Its frame has elongated arms near the front and back to prevent drooping. It uses rivets or fasteners. When installed, it covers substantially the entire car interior below the lower edge of the windshield, the side windows and the rear window. One variation uses a latch bolt lock to allow support arms to fold in a clockwise direction. Other alternative designs include detachable arms, sliding arms, an elevated inner portion, and instead of arms, suction cups and a hook to keep it in place, or a rigid material like cardboard.

U.S. Pat. No. 5,378,514 discloses an automobile sun-proof shade made of a bottom layer of polyester coated with an aluminum reflector, and a top layer of polyester coated with aluminum, with a resilient metal ring sealed between the top and bottom layers. However, the '514 patent does not specify where the shade is placed in the car or disclose much detail as to the specific use(s) of the shade.

Japanese Laid-Open Patent Publ. No. 2001-246942 discloses a manual car sun shade that appears to be placed in the front windshield of a car to provide shade. When not in use, it appears that the shade can be folded up and stored on the roof (or ceiling) of the car, and kept in place when folded with magnets. It also appears that the shade uses a hinge and either a magnet or tape.

Japanese Laid-Open Patent Publ. No. 63-82817 discloses a rear sun shade for a car, and is used specifically as a cover of a rear window panel. Part of the shade is designed such that one end is pulled or 'reeled' out or in and is attached to the rear seat when pulled out. It uses a hook to lock the shade to the rear roof when not in use. Its function appears to be to shield the sun shining in the head space in the occupant zone.

However, such conventional automobile shades typically require additional hardware (e.g., in addition to the hardware already in the car or on the shade itself), and may not adequately cover the entire major surface of the internal structure of the automobile to be protected, such as a front driver's seat, the front and back passenger seats, a steering wheel, and/or a gear shift. As such, there is a need for an apparatus that provides adequate coverage of the internal structures of a vehicle, and does so without requiring additional hardware.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention relate to apparatuses for protecting internal structures of a vehicle from various environmental factors (e.g., heat, sunlight, ultraviolet rays, etc.), that may cause damage to the internal structures of the vehicle or otherwise cause discomfort to passengers or operators using the vehicle. Embodiments of the present invention further relate to methods for making and using such apparatuses. In one aspect, the apparatus generally comprises (a) a front portion configured to cover an entire first major surface of the internal structure, (b) a back portion configured to cover a part of a second major surface of the internal structure opposite to the first major surface, and (c) a plurality of lateral portions configured to cover side surfaces of the internal structure between the first and second major surfaces, the plurality of lateral portions being joined directly or indirectly to each of the front portion and the back portion.

In a second aspect, the method of protecting an internal structure of a vehicle from sunlight and/or heat generally comprises unfolding or unhooking the apparatus, and placing the apparatus on or over the internal structure such that the front portion covers substantially the entire first major surface and the back portion covers part of the second major surface. Thus, the apparatus generally protects an internal structure of an automobile or other vehicle from sunlight, or other sources of heat and/or ultraviolet rays.

In a further aspect, the method of manufacturing the apparatus generally comprises (1) forming a front portion configured to cover an entire first major surface of the internal structure, (2) forming a back portion configured to cover a part of a second major surface of the internal structure opposite to the first major surface, (3) forming a plurality of lateral portions configured to cover side surfaces of the internal structure between the first major surface and the second major surface, wherein the plurality of side surfaces may be joined directly or indirectly to each of the front portion and the back portion, and (4) attaching the lateral portions to the front portion and/or the back portion. The methods and apparatuses of the present invention are not limited to automobiles. On the contrary, vehicles suitable for use with the apparatuses and methods described herein may also include trucks, buses, recreational vehicles, boats, planes, or any other type of passenger vehicle that would benefit from protection from the heat and/or sun.

The apparatus of the present invention reflects sunlight and/or heat away from the seats, steering wheel, gear shift, and/or any other internal structure of a vehicle. Consequently, the absorption of heat and/or sunlight can be minimized or prevented while the vehicle is parked or otherwise in the sun. During the hot months of the year, most noticeably when the temperatures reach or exceed 80° F., 90° F. or 100° F., a parked automobile or other vehicle may receive direct (or indirect) sunlight, resulting in the interior of the vehicle becoming much hotter than the environmental temperature. Also, in the hot months of the year, common attire may include shorts, skirts or dresses, or other attire that may expose a portion of an individual's skin (e.g., legs, arms, and/or hands, etc.). As such, individuals may find that once an automobile or vehicle has been parked in the sun, the internal structures of the vehicle (e.g., seat(s), gear shift, and/or the steering wheel of the automobile, etc.) can become extremely hot. The exposure of bare skin to such hot internal structures can be very uncomfortable, and in some instances can be dangerous.

The present invention advantageously provides an apparatus and method that reflects the heat away from internal structures of a vehicle, such as the seats, steering wheel, and gear shift of an automobile, thus preventing and/or minimizing the absorption of heat from direct and indirect sunlight while the vehicle is parked. Additional advantages of the present invention include, but are not limited to, (1) eliminating or minimizing the use of hardware needed to put the present apparatus (e.g., shade) in place over an internal structure or other portion of the vehicle, (2) enabling coverage of the entire major surface(s) of the seats, steering wheel, and/or gear shift, (3) enabling a tight or snug fit on the internal structure, and (4) enabling convenient and compact storage of the shade while not in use. In some embodiments, the apparatus or shade may have dimensions enabling a customized fit over one or more desired internal structures. In other embodiments, the apparatus or shade may have dimensions enabling placement over a wide variety of internal structures (e.g., a "one size fits all" approach).

Thus, the present invention enables an individual to immediately sit on the seats of a vehicle and/or touch the interior structures (e.g., steering wheel or gear shift, etc.) without experiencing discomfort upon entering the vehicle, almost as soon as the apparatus or shade is removed, because the apparatus prevents or minimizes the heat absorbed in the vehicle from ultraviolet rays. These and other advantages of the present invention will become readily apparent from the detailed description of various embodiments below.

DETAILED DESCRIPTION

Figure 1A:
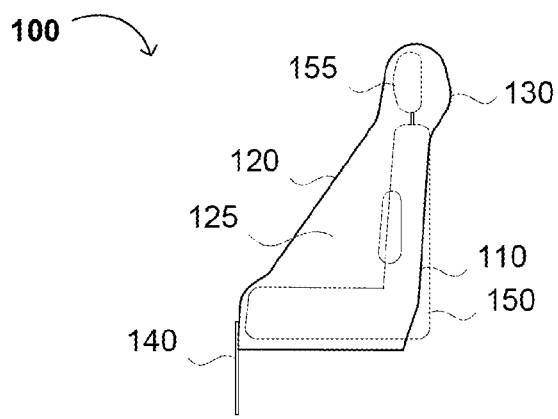
FIG. 1A is a diagram showing a side profile of an apparatus for protecting an internal structure of a vehicle from environmental factors such as heat and/or sunlight according to one embodiment of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

For the sake of convenience and simplicity, the terms "coupled to," "connected to," and "in communication with" mean direct or indirect coupling, connection or communication unless the context indicates otherwise. These terms are generally used interchangeably herein, but are generally given their art-recognized meanings. Also, for convenience and simplicity, the terms "shade," "sun shade," "car shade," "cover," "apparatus," and "automobile shade" may be used interchangeably with respect to intended uses and/or functions of an apparatus. In addition, the terms "item," "object," and "article" are used interchangeably, and wherever one such term is used, it also encompasses the other terms. In the present disclosure, a "major surface" of a structure or feature is a surface defined at least in part by the largest axis of the structure or feature (e.g., if the structure is round and has a radius greater than its thickness, the radial surface[s] is/are the major surface of the structure, and if the structure has three dimensions defined by a length, a width and a height or thickness, the major surface[s] of the structure may be the surface[s] defined by the two largest dimensions), and if the structure is substantially rectangular on all sides, the major surface is defined by the two largest axes. The invention, in its various aspects, will be explained in greater detail below with regard to exemplary embodiments.

An Exemplary Apparatus for Protecting an Internal Structure of a Vehicle from Environmental Factors In one aspect, the present invention relates to an apparatus for protecting an internal structure of an automobile or other vehicle from environmental factors, such as heat and/or sunlight, comprising (a) a front portion configured to cover an entire first major surface of the internal structure, (b) a back portion configured to cover a part of a second major surface of the internal structure opposite to the first major surface, and (c) a plurality of lateral portions covering side surfaces of the internal structure between the first major surface and the second major surface, the plurality of side surfaces being joined directly or indirectly to each of the front portion and the back portion.

Figure 1B:
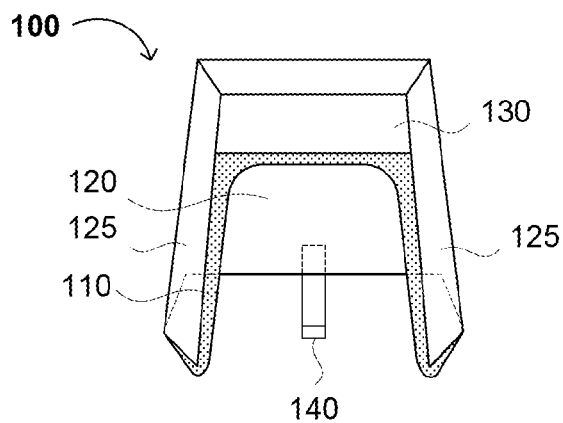
FIG. 1B is a diagram showing a rear view of the apparatus disclosed in FIG. 1A.
Figure 1C:
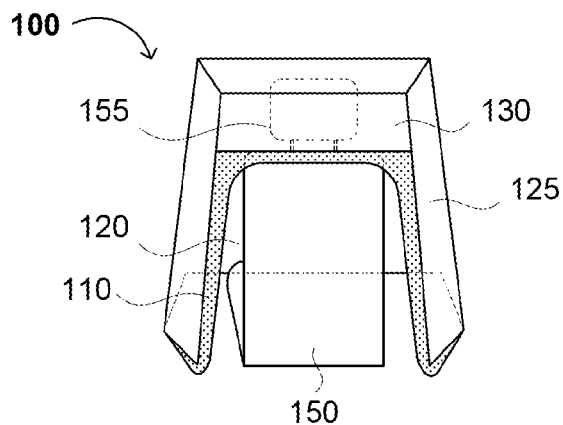
FIG. 1C is a diagram showing the rear view of the apparatus disclosed in FIG. 1B, including the internal structure.

A first embodiment is shown in FIGS. 1A-1C. Specifically, FIG. 1A shows a side profile of an apparatus 100 for protecting the internal structure 150 of an automobile (in this case, a single, bucket-type seat) from heat and/or sunlight according to the present invention. FIG. 1B shows a rear view of the apparatus of FIG. 1A without the internal structure, and FIG. 1C provides a rear view of the apparatus of FIG. 1A including the internal structure. A variety of internal structures of a vehicle may be protected by the apparatus(es) described herein. For example, in the embodiment shown in FIGS. 1A-1C, the internal structure 150 may comprise a front driver's seat or a front passenger seat. As shown in FIGS. 1A and 1C, the internal structure 150 (the driver's or passenger seat) typically has a major surface (e.g., on which the passenger or driver sits) and a second surface opposite to the major surface (e.g., the back of the seat and/or back of the headrest). The second surface of the internal structure 150 is generally oriented at an angle to the major surface of greater than 90° and less than or equal to 180°. More preferably, the angle is from about 135° to about 180°.

The apparatus 100 of FIGS. 1A-1C generally comprises a front portion 120 configured to cover an entire major surface of the seat (e.g., reference character 150 of FIGS. 1A and 1C). In addition, the apparatus 100 generally comprises a back portion 130 configured to cover a part of a second major surface of the seat 150 opposite to the major surface (e.g., the part behind the headrest 155). Furthermore, the apparatus 100 comprises a plurality of lateral portions 125, which cover the side surfaces of the seat 150 between the first major surface and the second major surface. The plurality of lateral portions 125 are joined directly or indirectly to each of the front portion 120 and the back portion 130, respectively.

Referring still to FIGS. 1A-1C, in various embodiments, at least one of the front portion 120, the back portion 130, and the plurality of lateral portions 125 comprises a plurality of layers. For example, in one embodiment, the plurality of layers comprises a first layer and a second layer. In such exemplary embodiments, the first layer generally includes a thin flexible insulative material. For example, the insulative material may comprise a fabric, such as a cotton material, a nylon material, a rayon material, a canvas, a polyester material, an acetate material, an acrylic, a linen material, a combination or a blend thereof, or any other suitable material or composition known in the art that is capable of insulating the vehicle's internal structure(s) from heat. The second layer generally comprises or consists of an uppermost reflective, pliable material. For example, the composition of the reflective material may include an aluminum foil, an aluminum sheet, an aluminum reflector, an aluminum coating, a combination or a blend thereof, or any other suitable material or composition known in the art that is capable of reflecting light. The first and second layers can be sewn together and stitched at the seams to fit the seats of different sizes and styles of vehicles (e.g., automobiles, recreational vehicles, trucks, buses, etc.).

In other exemplary embodiments, a border material 110 can be attached to at least part of a perimeter of the front portion 120, at least part of a perimeter of the back portion 130, and at least part of the perimeter of the plurality of lateral portions 125, as shown in FIG. 1B. The border material 110 generally has a width of at least 1 cm. In some embodiments, the back portion 130 may include a strip of pliable material that sits behind the steering wheel or the headrest(s) of a front seat or back seat of an automobile to keep the apparatus in place. The strip of pliable material may be about 3-18 inches in width (e.g., 3-15 inches, 5-10 inches, 6-8 inches, or any other value or range of values therein). The pliable border material 110 may comprise elastic, rubber, latex, polyester, lycra, rayon, nylon, composites and/or blends thereof, or any other material capable of stretching and returning to its original form upon removal of the stretching force applied to the material.

The back portion 130 of the apparatus may comprise a portion to hold the apparatus on the internal structure (e.g., the seat 150), as shown in FIG. 1C. In one embodiment, the portion (to hold the apparatus) may comprise a stitched seam interface between the border material 110 and the perimeter of the front portion 120, the back portion 130, and the plurality of lateral portions 125. In addition, in some embodiments, the apparatus 100 may include a strap 140 or other attaching mechanism configured to enable convenient and compact storage of the apparatus or shade while not in use. The storage strapping mechanism is described in detail below with regard to FIGS. 5A-5B.

Figure 2:
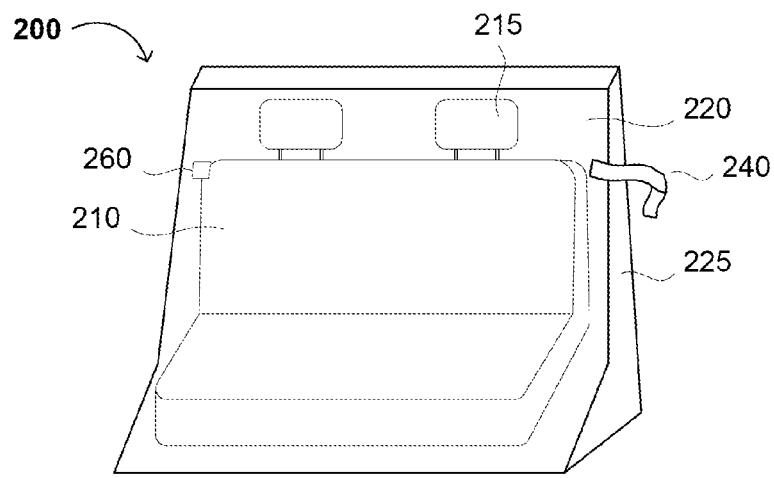
FIG. 2 is a diagram showing a front view of an apparatus according to a second embodiment of the present invention, including the internal structure of the vehicle.

FIG. 2 shows a front view of an alternate embodiment in which the internal structure 210 comprises a back passenger seat or a bench-type seat. As shown in FIG. 2, the apparatus 200 includes a front portion 220, a back portion (not shown in FIG. 2), and a plurality of lateral portions 225. As described above with regard to FIGS. 1A-1C, the front portion 220 is configured to cover the entire major surface of the seat 210, and the back portion is configured to cover a portion of the second surface of the seat 210 opposite to the major surface (e.g., the part behind the headrest 215). Also as described above with regard to FIGS. 1A-1C, the plurality of lateral portions 225 cover the side surfaces of the seat 210 between the major surface and the second surface of the seat, and the plurality of lateral portions 225 are joined directly or indirectly to each of the front portion 220 and the back portion of the apparatus 200, respectively.

The apparatus of FIG. 2 may include multiple layers and/or a border material, as described herein, and may be made of any material or composition described herein. Furthermore, as shown in FIG. 2, the apparatus may comprise at least one strap 240 configured to be fastened to a fastening portion or surface 260 on the apparatus 200. Such a fastening strap is described in detail herein with regard to FIGS. 5A-5B.

In various embodiments (e.g., as shown in FIGS. 1A-1C and FIG. 2), the front portion of the apparatus 120/220 and/or the back portion of the apparatus 130 of FIG. 1A may have an irregular shape. Similarly, referring again to FIGS. 1A-1C and 2, the lateral portions 125/225 of the apparatus may also have an irregular shape.

Figure 3A:
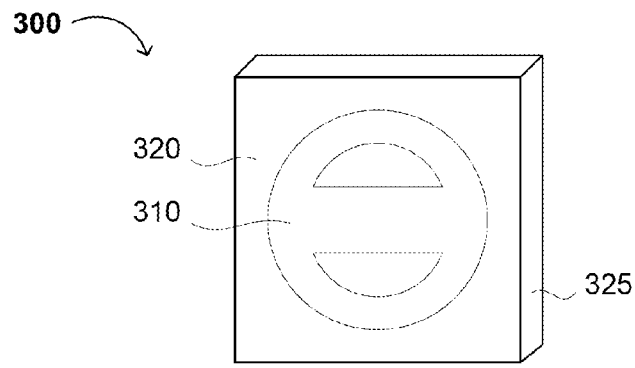
FIG. 3A is a diagram showing a front view of an apparatus according to a third embodiment of the present invention, including the internal structure of the vehicle.
Figure 3B:
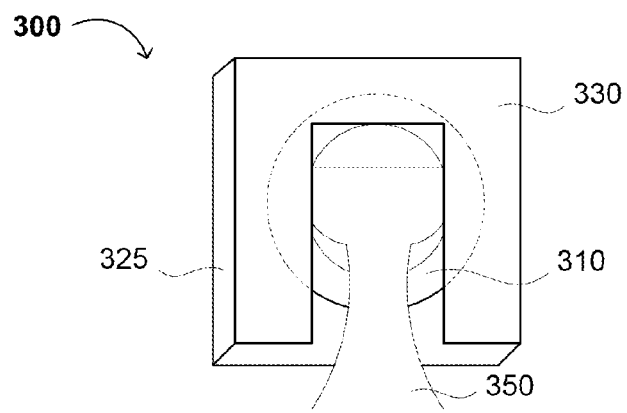
FIG. 3B is a diagram showing a back view of the apparatus disclosed in FIG. 3A, including the internal structure.

In contrast, in other embodiments, the front portion, back portion and/or lateral portions of the apparatus may be substantially square or rectangular. For example, FIGS. 3A-3B show front and back views, respectively, of an apparatus 300 covering the steering mechanism or wheel 310 of a vehicle. As shown in FIG. 3A, the front portion 320 is substantially square-shaped, and the lateral portions 325 are substantially rectangular. Furthermore, as shown in FIG. 3B, in some embodiments, the back portion 330 may also comprise an opening that is sufficiently large to place the apparatus 300 over the steering wheel 310 and also accommodate a steering column 350 that connects the steering wheel 310 to the dashboard of the vehicle.

Figure 4A:
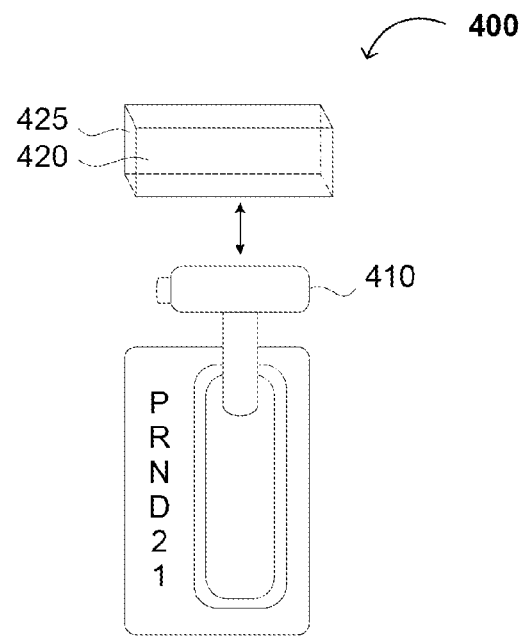
FIG. 4A is a diagram showing a front view of an apparatus according to a fourth embodiment of the present invention, including the internal structure of the vehicle.
Figure 4B:
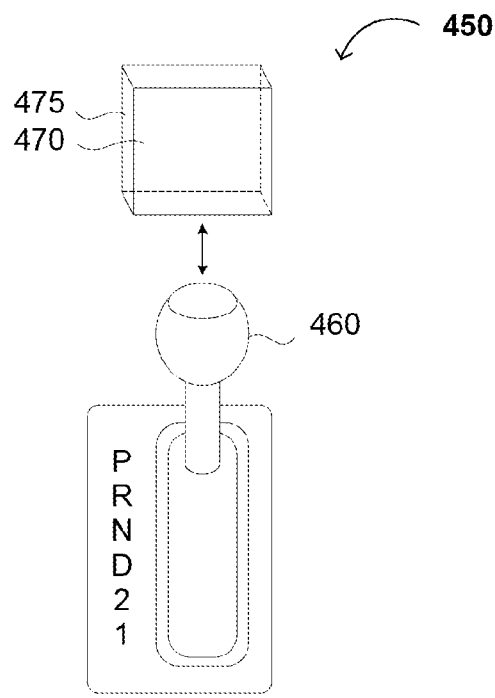
FIG. 4B is a diagram showing a front view of an alternative apparatus according to the fourth embodiment of the present invention, including the internal structure.

In another embodiment, an apparatus 400 for protecting a gear shifting mechanism 410 is shown in FIG. 4A. The gear shifting mechanism 410 of FIG. 4A is substantially rectangular (or core shaped), and consequently, the front portion 420 of the apparatus 400 is also rectangular in shape. A second example of an apparatus 450 for protecting a gear shifting mechanism 460 is shown in FIG. 4B. The gear shifting mechanism 460 of FIG. 4B is substantially spherical, and in this embodiment the front portion 470 of the apparatus 450 is square-shaped. Furthermore, in some exemplary embodiments, the lateral portions of the apparatus may be substantially square (see, e.g., reference character 425 of FIG. 4A) or rectangular (see, e.g., reference characters 325 and 475 of FIGS. 3A and 4B, respectively).

However, the shapes and sizes of the apparatus are not limited to the examples provided herein. On the contrary, the front, back, and lateral portions of the apparatus may have any shape or size that is suitable to cover and protect a desired internal structure of a vehicle. For example, although not shown in the figures, the shape of the front portion, the back portion, and/or the lateral portions may be oval, round, or any other shape that is suitable for providing protection to the internal structures of a vehicle. In addition, in some instances, if desired, the corners of the front, back, and/or lateral portions may be rounded, even when the front, back, and/or lateral portion(s) is substantially rectangular in shape.

In various embodiments, the front portion (e.g., reference characters 120 and 320 of FIGS. 1A-1C and 3A-3B, respectively) of the apparatus may have a first area that is significantly larger than a second area of the back portion (e.g., reference characters 130 and 330 of FIGS. 1A-1C and 3A-3B, respectively). In some exemplary embodiments, the front portion has dimensions greater than or equal to the first and/or second surfaces of the internal structures of the vehicle. Although the back portion of the apparatus 200 in FIG. 2 is not shown, in one embodiment, it may have a width and/or height sufficient to cover some or substantially all of the headrests 215.

In some implementations, the back portion of the apparatus may comprise an opening sufficiently large enough to place the apparatus over the internal structures, such as the seat (see, e.g., FIG. 1C), the gear shift (see, e.g., FIGS. 4A-4B), the dashboard (not shown in the figures), or the steering wheel (see, e.g., FIG. 3B) of the vehicle. Furthermore, as shown in FIG. 3B and previously discussed herein, in some embodiments, the back portion 330 may also comprise an opening that is sufficiently large to place the apparatus 300 over the steering wheel 310 and also accommodate a steering column 350 that connects the steering wheel 310 to the dashboard of the vehicle.

Figure 5A:
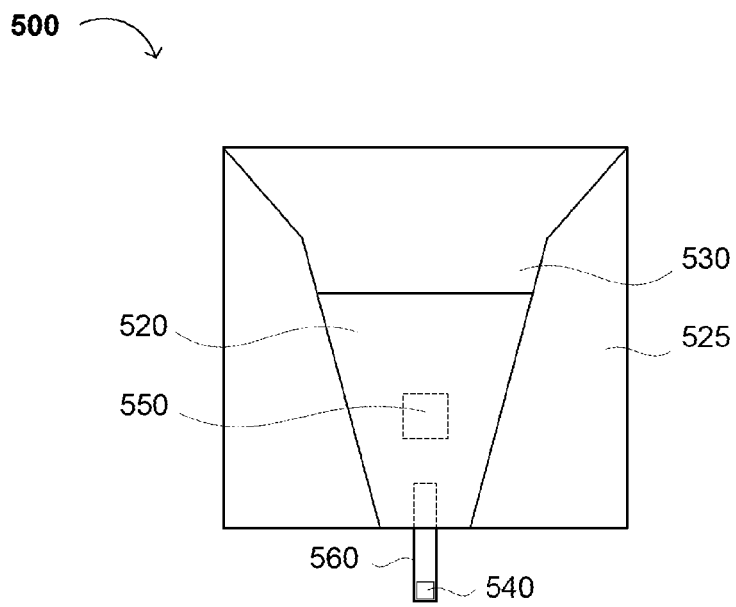
FIG. 5A is a diagram showing a rear view of the apparatus disclosed in FIG. 1A, partially folded and including a strap for fastening.
Figure 5B:
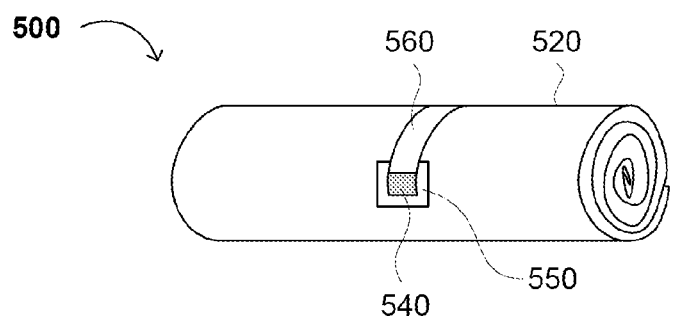
FIG. 5B is a diagram showing the apparatus of FIG. 5A, folded and rolled, and fastened with the strap.

In some of the embodiments, the apparatus may comprise at least one strap (see reference characters 140, 240, and 560 of FIGS. 1A-1B, 2, and 5A-5B, respectively) configured to be fastened to a fastening portion or surface (see reference characters 260 and 560 of FIGS. 2 and 5A-5B, respectively) on the apparatus. Referring now to FIGS. 5A-5B, at least one strap 560 is fastened to at least one end and/or to the periphery, border and/or edge of the front portion and/or the back portion of the apparatus 500. The strap 560 is generally configured to hold the apparatus 500 in place when rolled or folded, as shown in FIG. 5B. In various embodiments, the strap 560 comprises a hook-and-loop fastening mechanism. Generally, the hook-and-loop mechanism comprises a first portion 540 (generally on strap 560) having a plurality of relatively small hooks and a second portion 550 (a fastening surface) having a plurality of relatively small loops (e.g., VELCRO® fasteners). In other embodiments, the strap 560 may be fastened to fastening surface 550 with a button, a zipper, a tied lace, a snap, a buckle, reusable adhesive, or any other suitable fastening mechanism known in the art.

An Exemplary Method of Manufacturing an Apparatus for Protecting an Internal Structure of an Automobile from Heat and/or Sunlight In another aspect, the present invention relates to a method of manufacturing an apparatus for protecting an internal structure of an automobile from heat and/or sunlight, comprising (a) forming a front portion configured to cover an entire first major surface of the internal structure, (b) forming a back portion configured to cover a part of a second major surface of the internal structure opposite to the first major surface, (c) forming a plurality of lateral portions covering side surfaces of the internal structure between the first major surface and the second major surface, the plurality of side surfaces being joined directly or indirectly to each of the front portion and the back portion, and (d) attaching the front portion, the back portion, and the lateral portions.

Referring again to FIGS. 1A and 2, forming at least one (and preferably all) of the front portion 120 (220 in FIG. 2), the back portion 130, and the plurality of lateral portions 125 (225 in FIG. 2) may comprise forming a plurality of layers, generally in the shape of the front portion, the back portion, and the lateral portions, respectively, and sealing or stitching the layers together in the shapes of the respective portions. In one exemplary embodiment, the plurality of layers comprises a first layer and a second layer, as described herein (see e.g., the section entitled "An Exemplary Apparatus for Protecting an Internal Structure of a Vehicle from Environmental Factors" above).

Referring still to FIGS. 1A and 2, in various embodiments, a border material 110 (210 of FIG. 2) is attached to at least part of a perimeter of the front portion 120 (220 of FIG. 2), at least part of a perimeter of the back portion 130, and at least part of the perimeters of each of the plurality of lateral portions 125 (225 of FIG. 2). In general, forming the border material 110 (210 of FIG. 2) comprises fastening, sewing, and/or attaching a strip of material to the perimeter of the back portion 130 or lateral portion(s) 125 of the apparatus. Similarly, the front portion 120, the lateral portion(s) 125, and the back portion 130 may be attached to a different portion by fastening, sewing, gluing, or otherwise attaching the two (or more) portions to each other along one or more peripheral edges. In some embodiments, a seam interface may be stitched between the border material 110 and the perimeter of the apparatus 100. Typically, the seam interface has a width of at least 0.5 cm.

In some exemplary implementations, when the front portion, the back portion, and the lateral portions are attached to one another, an opening is created in the back portion that is sufficiently large to enable placement of the apparatus over a seat, gear shift, steering wheel, or other internal structure of the automobile or other vehicle. For example, when the front portion 120, the back portion 130, and the lateral portions 125 of the apparatus 100 shown in FIGS. 1B-1C are attached, an opening is created in the back portion 130 so that the apparatus 100 can be placed over the seat 150. Similarly, as shown in FIGS. 3A-3B, when the front portion 320, the back portion 330, and the lateral portions 325 are attached to one another, an opening is created in the back portion 330 so that the apparatus 300 can be placed over the steering wheel 310, and also the steering column, which attaches the steering wheel 310 to the dashboard (not shown in FIG. 3B).

Referring now to FIG. 5A, in some embodiments, a strap 560 and fastening surface 550 are attached to the front portion 520 of the apparatus 500. Typically, the strap 560 is configured to hold the apparatus 500 in place when rolled or folded, as shown in FIG. 5B. At least one strap 560 is fastened to at least one end or peripheral to the border of the apparatus 500. In one embodiment, the strap 560 is attached to the apparatus by (1) attaching a first portion 540 of a hook-and-loop material to the strap 560, (2) attaching the strap 560 to an end, edge, border or periphery of the apparatus 500, and (3) attaching a second portion 550 of the hook-and-loop material to the front portion 520 of the apparatus 500 or to an opposite end of the strap 560. Generally, the hook-and-loop mechanism comprises a first portion 540 having a plurality of small hooks (not shown) and a second portion 550 having a plurality of small loops. In such embodiments, the first and second portions (540 and 550, respectively) of the hook-and-loop material are sufficiently spaced apart to enable attachment, fastening, or contacting the hook portion (e.g., first portion 540) to the loop portion (e.g., second portion 550) after folding, rolling, or condensing the apparatus 500.

An Exemplary Method of Protecting an Internal Structure of an Automobile from Heat and/or Sunlight In another aspect, the present invention relates to a method of protecting an internal structure of an automobile from heat and/or sunlight, comprising (a) unfolding or unhooking the apparatus as described herein, and (b) placing the apparatus on a major surface of the internal structure.

The apparatus as described herein, can be folded for storage, and unfolded for placement onto the vehicle seat(s), gear shift, steering wheel, or other internal structure of the vehicle (e.g., a driver's seat, a front seat, a passenger seat, a back passenger seat, a bench seat, a steering wheel, a dashboard, a gear shift, an arm rest, or any other interior structure to be protected). The apparatus or shade can be easily placed or slipped over the seat, gear shift, steering wheel, or other internal structure by holding the apparatus in place on the internal structure (e.g., the automobile seat(s), gear shift, or steering wheel, etc.) by wrapping a border material (e.g., reference character 110 of FIGS. 1A-1C) of the apparatus around a portion of the internal structure to be protected. The apparatus can subsequently be easily removed and folded for storage when not in use, as described herein with regard to FIGS. 5B and 6A-6C.

In one exemplary embodiment, the front portion of the apparatus (e.g., reference character 120 of FIGS. 1A-1B, and/or 220 of FIG. 2) is placed on or over the internal structure so that the front portion covers all of the major surface area (e.g., the front) of the internal structure. For example, as shown in FIG. 1A, the front portion 120 of the apparatus 100 is placed on the seat 150 so that the front portion 120 covers all of the major surface of the driver's or passenger's seat 150 on which an individual would normally sit while riding in an automobile or other vehicle. The apparatus 100 is also placed on the seat 150 so that the back portion 130 covers a portion of a second, opposite surface of the seat 150 (e.g., covering the back of headrest 155). When placed on the seat 150, the lateral portion(s) 125 cover the seat 150 in one or more regions between the front and back surfaces.

Referring now to FIG. 2, in an alternate embodiment, the apparatus 200 is placed over a back seat or a bench-type seat 210, as shown in FIG. 2. In this embodiment, the apparatus 200 is placed on or over the bench-type seat 210 so that the front portion 220 covers all of a major surface area (e.g., the front) of the internal structure. As explained above with regard to FIG. 1A, the major surface of the seat 210 may be the portion of the seat where an individual would normally sit while riding in an automobile or other vehicle. The apparatus 200 is also placed on the seat 210 so that the back portion (not shown in FIG. 2) of the apparatus 200 covers a portion of a second surface of the seat 210 (e.g., covering the back of headrest 215). As described with regard to the embodiment of FIG. 1A, when placed on the seat 210, the lateral portion(s) 225 cover the seat 210 in one or more regions between the front and back surfaces.

In a third embodiment shown in FIGS. 3A-3B, the front portion 320 of the apparatus 300 is placed on or over the internal structure (e.g., steering wheel 310) to cover a major surface of the steering wheel 310 (e.g., the front of the steering wheel). The apparatus 300 is placed on or over the steering wheel 310 so that the back portion 330 of the apparatus 300 covers one or more portions of a second surface of the steering wheel (e.g., the back of the steering wheel). When the apparatus 300 is placed on the internal structure 310 (e.g., the steering wheel), the lateral portion(s) 325 of the apparatus 300 cover the steering wheel 310 in regions between the first and second surfaces of the steering wheel 310. In some implementations, the apparatus 300 may have an opening at the bottom where it can be slipped over the steering wheel 310. In other exemplary implementations, the apparatus 300 may have an opening in the back portion 330 so that the apparatus 300 can also be easily placed on or over the steering column 350 connecting the steering wheel 310 to the dashboard (not shown) of the vehicle.

The apparatus of the present invention may also be placed over a gear shifting mechanism. As shown in FIGS. 4A and/or 4B, the front portion 420 or 470, the lateral portions 425 or 475, and the back portion of the apparatus 400 or 450 are placed on or over a gear shift 410 or 460 to cover the front, side, and back surfaces of the gear shift 410 or 460, respectively. The apparatus 400, 450 may have an opening at the bottom where it can be slipped over the gearshift handle. Although not shown in FIGS. 4A-4B, in some implementations, the apparatus may have a length sufficient to cover the full height or length of the gearshift handle.

As previously described herein with regard to exemplary apparatuses for protecting an internal structure of a vehicle from environmental factors, the apparatus may come in various sizes depending on the style and/or shape of the internal structure (e.g., seat, steering wheel, gearshift handle, etc.), and can be easily placed on or removed from the internal structure (e.g., gear shift and handle, steering wheel and column, etc.) by slipping the apparatus on or off. Using various shading apparatuses, this form of coverage advantageously shades the seats, steering wheel, gear shift, and/or other internal structures during the entire duration that the vehicle is parked or otherwise located in the sun.

When the apparatus, cover and/or shade is/are not in use, it can be removed from the internal structure and folded for relatively easy and fast storage. In various embodiments, removing the apparatus from the structure comprises pulling the apparatus off of the structure and folding the apparatus. Referring now to FIGS. 5A-5B, folding the apparatus 500 may comprise collapsing the lateral portions 525 and/or the back portion 530, as shown in FIG. 5A. Next, the apparatus 500 is folded or rolled, (e.g., as shown in FIG. 5B). For example, in one embodiment, when the apparatus 500 is not in use, to accommodate the material, the apparatus 500 can be partially folded and then rolled up from one end (e.g., along a peripheral edge, or from the end with the shortest dimension), as shown in FIG. 5B.

Figure 6A:
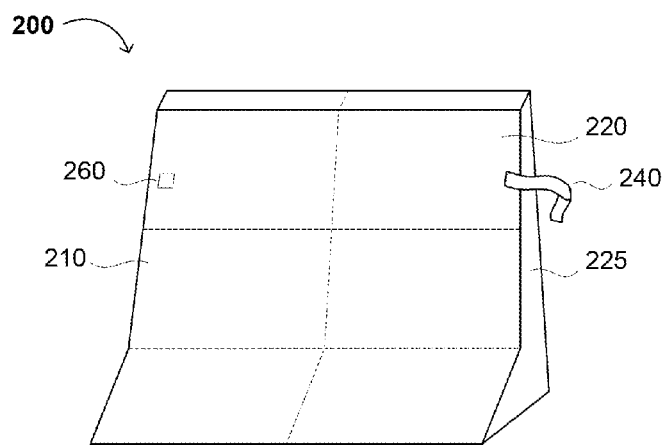
FIG. 6A is a diagram showing a front view of the apparatus disclosed in FIG. 2A, showing fold lines and a strap for securing the folded apparatus.

Referring now to FIG. 6A, in another embodiment, folding the apparatus (e.g., apparatus 200 covering bench seat 210 of FIG. 2) may comprise collapsing the lateral portions 225 and/or back portion (not shown), and then subsequently folding the front portion 210 in thirds along first creases designated by the horizontal dotted lines. Although not shown in FIG. 6A, in some variations, the front portion 210 may optionally be folded in another fractional portion, such in quarters or in half, as may be appropriate for the shape and size of the apparatus. The apparatus 200 of FIG. 6A may be further folded in half (or other fractional portion as may be appropriate, such in quarters or in thirds) along a second crease shown by the vertical line on the front portion 210 in FIG. 6A. In one embodiment, the apparatus 200 of FIG. 6A is folded such that the front surface 210 remains on the outside of the folded apparatus 200.

Figure 6B:
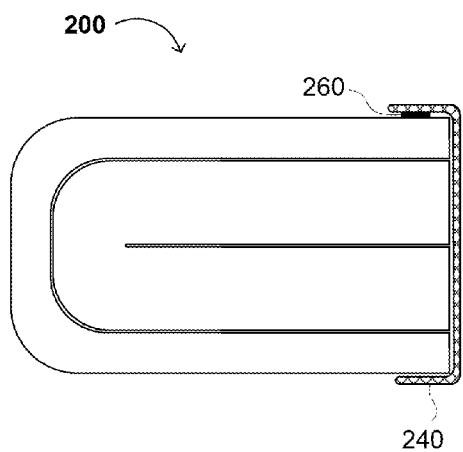
FIG. 6B is a diagram showing a bottom-edge view of the apparatus of FIG. 6A, folded and fastened with the strap.
Figure 6C:
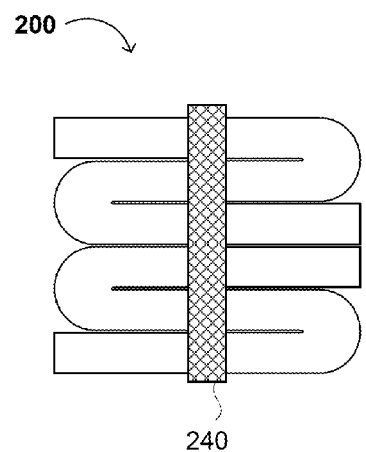
FIG. 6C is a diagram showing a side-edge view of the apparatus of FIG. 6A, folded and including a strap for fastening.

Referring still to FIG. 6A, after folding the apparatus 200, the strap 240 of the apparatus 200 is fastened to the fastening surface 260. The strap 240 is configured to hold the apparatus 200 in a folded and relatively compact position. The folded and fastened apparatus 200 is shown in FIGS. 6B and 6C. Specifically, FIG. 6B shows the folded and fastened apparatus 200 after it has been rotated to view the folded apparatus from the bottom edge. FIG. 6C shows the folded and fastened apparatus 200 after it has been rotated to view the folded apparatus from the side edge with the strap 240 across the side edge and holding the apparatus in the fastened state.

As previously described herein, after the apparatus is rolled or folded, it can be fastened and held together by a strap or other suitable fastening mechanism. For example, as previously described in detail herein, the strap (e.g., reference character 560 of FIGS. 5A-5B and/or reference character 240 of FIGS. 6A-6C) is generally configured to hold the apparatus in place when rolled or folded, as shown in FIGS. 5B and 6B-6C. In exemplary embodiments, the apparatus 500 may be rolled into a cylinder shape as shown in FIG. 5B, or folded as shown in FIGS. 6B-6C.

Referring to FIG. 5A, in some implementations, the strap 560 may comprise a hook-and-loop mechanism (not shown), which may include a first portion 540 having a plurality of hooks and a second portion 550 having a plurality of loops. As previously described herein with regard to exemplary apparatuses for protecting an internal structure of a vehicle, in general, the hook portion 540 is attached to an end of the strap 560, and the loop portion 550 is attached or affixed to front surface 520 of apparatus 500. Alternatively, the hook portion 540 is placed on one end of the strap 560, and the loop portion 550 is attached to an opposing end of the strap 560 that is attached, fastened or affixed to the surface of the apparatus 500. In other embodiments, the strap (e.g., reference character 560 of FIGS. 5A-5B) may be fastened to a fastening surface 550 with a button, a zipper, a tied lace, a snap, a buckle, reusable adhesive, or any other suitable fastening mechanism known in the art (see the section above entitled, "An Exemplary Apparatus for Protecting an Internal Structure of a Vehicle form Environmental Factors"). In various embodiments, the strap 560 may be just long enough to encompass the circumference of the rolled up apparatus 500, or reach or stretch across the folded apparatus 200 (e.g., FIGS. 6B-6C), and be securely attached to keep the rolled up apparatus 500 or folded apparatus 200 compactly and neatly secured for quick and easy storage.

CONCLUSION/SUMMARY

Thus, embodiments of the present disclosure provide an apparatus that reflects heat, sunlight, and/or ultra-violet rays away from internal structures of a vehicle, such as the seats, steering wheel, gear shift, dashboard, and/or arm rest of an automobile. Furthermore, embodiments of the present invention provide methods of making and using such an apparatus. Embodiments of the present disclosure prevent and/or minimize the absorption of heat from direct and indirect sunlight while the automobile is parked. Additional advantages of the present disclosure include, but are not limited to, (1) eliminating or minimizing the use of hardware needed to attach or secure a shade, (2) enabling coverage of the entire major surface of the internal structures (e.g., seats, steering wheel, and/or gear shift, etc.), (3) enabling a tight or snug fit of the apparatus on the internal structure, (4) utilizing a flexible reflective insulated material, and (5) enabling convenient and compact storage of the shade while not in use. Thus, the present invention enables an individual to immediately sit on the automobile seats and/or touch the internal structures of the vehicle (e.g., steering wheel or gear shift, etc.) without experiencing pain or discomfort by preventing or minimizing the heat absorbed in the automobile from heat and/or sunlight.

The foregoing descriptions of embodiments of the present disclosure have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A folded or rolled apparatus for protecting an internal structure of a vehicle from heat and/or sunlight, comprising:
   a) a front portion comprising a first layer including a flexible insulative material and a second layer including an uppermost reflective material, the front portion having dimensions sufficient to cover an entire major surface of the internal structure;
   b) a back portion comprising a material to hold the apparatus on the internal structure and having dimensions sufficient to cover a part of a second surface of the internal structure opposite to the major surface;

c) a plurality of lateral portions covering side surfaces of the internal structure between the major surface and the second surface, the plurality of side surfaces being joined to each of the front portion and the back portion; and d) at least one strap having a first end fastened to the front portion, and a second end fastened or attached to a fastening portion on a surface of the folded and/or rolled apparatus, the at least one strap and the fastening portion configured to secure and/or hold the folded or rolled apparatus in a folded or rolled configuration by encompassing, reaching or stretching across part or all of a circumference of the rolled apparatus or a periphery of the folded apparatus, wherein the front portion has an area greater than that of the back portion.

2. The apparatus of claim 1, further comprising a border material attached to at least part of a perimeter of the front portion, at least part of a perimeter of the back portion, and at least part of the perimeter of the plurality of lateral portions.

3. The apparatus of claim 1, wherein at least one of the back portion and the plurality of lateral portions comprises the first and second layers.

4. The apparatus of claim 1, further comprising a stitched seam interface between at least part of a perimeter of the front portion and at least one of the plurality of lateral portions, and between the back portion and at least one of the plurality of lateral portions.

5. The apparatus of claim 1, wherein one or more of the front portion, the back portion, and the lateral portions are substantially square, rectangular, oval, or round in shape.

6. The apparatus of claim 1, wherein the front portion has dimensions greater than the major surface of the internal structure.

7. The apparatus of claim 1, wherein the back portion has dimensions enabling formation of an opening sufficiently large to place the apparatus over the internal structure.

8. The apparatus of claim 1, wherein the material of the back portion comprises a strip of pliable material that keeps the apparatus in place on the internal structure.

9. The apparatus of claim 1, wherein the strip of pliable material comprises an elastic, rubber, latex, polyester, lycra, rayon, nylon, or a composite and/or blend thereof, that returns to its original form upon removal of a stretching force applied to the material.

10. A method of manufacturing an apparatus for protecting an internal structure of a vehicle from heat and/or sunlight, comprising:

a) forming a front portion having dimensions sufficient to cover an entire major surface of the internal structure, the front portion comprising a first layer including a flexible insulative material and a second layer including an uppermost reflective material;

b) forming a back portion having dimensions sufficient to cover a part of a second surface of the internal structure opposite to the major surface, the back portion comprising a material to hold the apparatus on the internal structure and having an area less than that of the front portion;

c) forming a plurality of lateral portions configured to cover side surfaces of the internal structure between the major surface and the second surface, the plurality of lateral portions being configured to be joined to each of the front portion and the back portion;

d) attaching the front portion and the back portion to the lateral portions;

e) attaching or fastening an end of at least one strap to the front portion, and attaching a fastening portion on a surface of the apparatus, the at least one strap and the fastening portion being configured to secure and/or hold the folded or rolled apparatus in a folded or rolled configuration by encompassing, reaching or stretching across part or all of a circumference of the rolled apparatus or a periphery of the folded apparatus; and f) folding or rolling the apparatus and securing the at least one strap to the fastening portion after the apparatus is folded or rolled.

11. The method of claim 10, further comprising attaching a border material to at least part of a perimeter of the back portion and at least part of a perimeter of each of the plurality of lateral portions, wherein the border material is attached by fastening, sewing, and/or attaching a strip of material to the perimeter of the back portion and the plurality of lateral portions.

12. The method of claim 10, further comprising forming a first stitched seam interface between the front portion and the lateral portions and a second stitched seam interface between the back portion and the lateral portions.

13. The method of claim 10, wherein attaching the front and back portions to the lateral portions forms an opening sufficiently large to place the apparatus over the internal structure.

14. The method of claim 10, wherein the material of the back portion comprises a strip of pliable material that keeps the apparatus in place on the internal structure.

15. The method of claim 14, wherein the strip of pliable material comprises an elastic, rubber, latex, polyester, lycra, rayon, nylon, or a composite and/or blend thereof, that returns to its original form upon removal of a stretching force applied to the material.

16. A method of protecting an internal structure of a vehicle from heat and/or sunlight, comprising:

a) providing the folded or rolled apparatus of claim 1;

b) detaching or unfastening the at least one strap from the fastening portion of the folded or rolled apparatus;

c) unfolding or unrolling the folded or rolled apparatus;

d) placing the unfolded and unrolled apparatus on or over the internal structure such that the front portion covers substantially the entire first major surface and the back portion covers part of the second surface.

17. The method of claim 16, further comprising holding the apparatus in place on the internal structure by wrapping a border material of the apparatus around a portion of the structure.

18. The method of claim 16, further comprising removing the apparatus from the structure and folding or rolling the apparatus.

19. The method of claim 18, wherein folding the apparatus comprises collapsing the lateral portions.

* * * * *